July 18, 1944.  G. C. STAATS  2,353,939
DETACHABLE LINK
Filed March 13, 1943
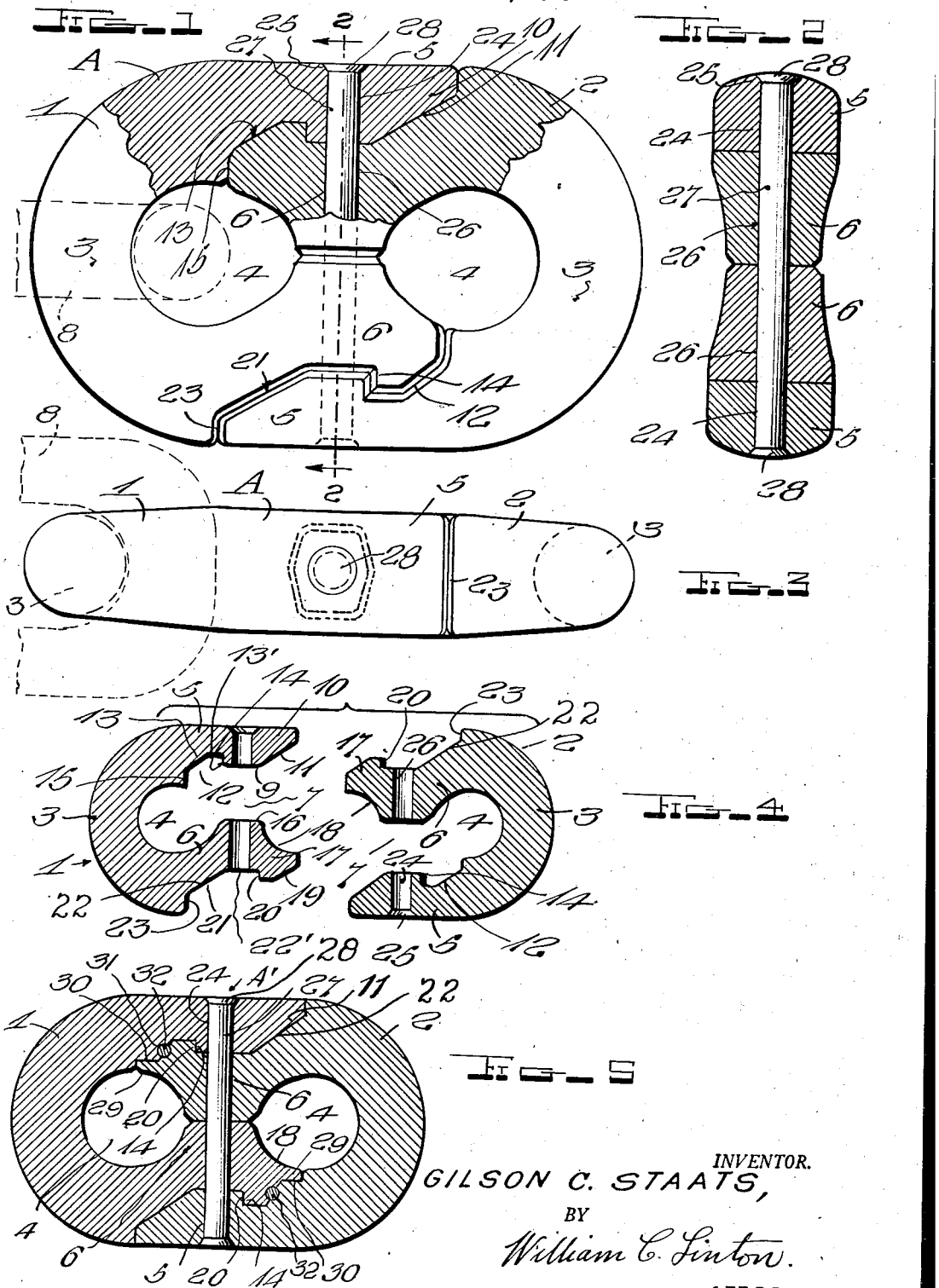
INVENTOR.
GILSON C. STAATS,
BY
William C. Linton.
ATTORNEY Patented July 18, 1944

2,353,939

UNITED STATES PATENT OFFICE 2,353,939

DETACHABLE LINK

Gilson C. Staats, Chester, Pa., assignor to himself and N. D. Powell, New York, N. Y.

Application March 13, 1943, Serial No. 479,125

7 Claims. (Cl. 59—85)

This invention relates to improvements in separable and detachable links or shackles, and particularly to links or shackles of that type comprising a pair of members or sections having interlocking engagement with each other and held assembled by fastening means normally uniting them in a firm and secure manner, but adapting them to be separated when required for the substitution of a new link member or other part for a completely worn out one, or the disconnection of the elements joined by the link or shackle.

One object of the invention is to provide a link or shackle of this character which is formed of substantially duplicate sections, and, therefore, adapted to be economically made, which sections are provided with interengaging portions adapting them to be readily assembled and disassembled by relative lateral movements thereof, and when assembled to be held against separation by relative longitudinal movements thereof, and which sections are adapted to be held assembled and against lateral separating movement by a fastening pin or the like which, while normally holding them securely against separation, may be removed when it is desired to disconnect the sections.

Another object of the invention is to provide a detachable link or shackle which comprises a minimum number of parts of a character giving great strength and durability thereto.

Still another object of the invention is to provide a link or shackle which, in the event that it develops any looseness between the sections, due to wear or other causes, may be tightened in a ready and convenient manner.

With these and other objects in view, the invention consists in certain novel features of construction, combination and arrangement of parts, hereinafter fully described and claimed, and as shown in the accompanying drawing, in which:

Fig. 1 is a view in side elevation, partly in section, of a detachable link or shackle embodying my invention, and showing the parts as united for use.

Fig. 2 is a transverse section thereof on the line 2—2 of Fig. 1.

Fig. 3 is a plan view of the link or shackle.

Fig. 4 is a longitudinal section through the sections of the link or shackle and showing the same separated from each other.

Fig. 5 is a longitudinal section through the link or shackle with the sections united and showing a modified form of construction.

Referring now more particularly to the drawing, the link or shackle A shown in Figs. 1 to 4, inclusive, comprises a pair of substantially U-shaped duplicate sections, halves or members 1 and 2, each consisting of a body portion 3 formed with a receiving eye or opening 4 and with a pair of inwardly projecting arms 5 and 6. The arms 5 and 6 are arranged substantially in parallel relation and spaced to provide a throat or passage 7 communicating with the eye or opening 4. When the members 1 and 2 are disconnected the throat 7 admits of the introduction into the eye 4 of either member of the detachable link of the end of a chain link or other element 8, as shown in dotted lines in Figs. 1 and 3, with which the detachable link is to be connected, or of the withdrawal from the eye 4 of an element 8 which has been connected to the detachable link. The link A may form a coupling connection between two such link elements 8 of a chain, in which case the members 1 and 2 are engaged with the adjacent ends of adjoining link elements of the chain, or the detachable link may be used to couple the link element of one end of a chain to anything to which it is to be fastened, or the detachable link may be employed to serve the function of a shackle and for many other similar purposes.

The arms 5 and 6 of each member differ in construction, but the corresponding arms of the two members are similar in construction to each other. Each member 1 and 2 is a substantial duplicate of the other, but in use they are employed as rights and lefts, or with their arms 5 and 6 in reverse order, so that the arm 5 of each member coacts interengagingly with the arm 6 of the other member. For the purpose of distinguishing these arms the arm 5 may be termed a male coupling arm and the arm 6 with which it coacts a female coupling arm. These arms are of novel and peculiar construction, as will now be more fully described.

As shown, the arm 5 of each member is arranged in alinement with the end of the body 3 from which it projects, while the arm 6 of each member is arranged to lie in a plane offset inwardly from the opposite end of the body 3 from which it projects. The arrangement is thus such that when the members 1 and 2 are assembled the arm 5 of each member will overlap and lie outside the arm 6 of the other member and so that the arm 6 of each member will be received in the throat or passage between the arms 5 and 6 of the other member and close said throat or passage. When so arranged all the arms will be disposed in lapping order to form a link or shackle having an eye at each end closed against communication with the other eye by the intervening portions of the lapping arms.

The arm 5 of each member is provided with a central boss or contact face 9 and with an end tongue 10 having a beveled or inner surface 11. On its inner side the arm 5 is also provided with a recess 12 lying between the boss 9 and adjacent end of the body 3 and formed with a beveled wall 13, a short straight wall 13' and outer or inner end walls or shoulders 14 and 15. The arm 6 of each member is provided with a central boss or contact face 16 and with an end tongue 17, said tongue having an inner curved face 18 and being otherwise of a shape conforming to and adapted to snugly fit the recess 12 in the arm 5 of the other member, said tongue being adapted to abut at its end against the shoulder 15 of the recess 12 and having a beveled face 19 and a shoulder 20 to engage the wall 13 and shoulder 14 of the recess 12. The arm 6 of each member is also formed in its outer side with a recess 21 similar in form to the recess 12, but of greater length and having a beveled wall 22, straight wall 22', an inner end shoulder 23 and an outer end shoulder formed by the tongue shoulder 20. Through the body portions and bosses of the arms 5 extend openings 24, countersunk at their outer ends, as shown at 25, and through the body portions and bosses of the arms 6 extend openings 26 which, when the members are assembled, register with each other centrally of the link or shackle, as shown in Figs. 1, 2 and 5.

The above described forms of the arms provide a construction of interengaging surfaces adapting the members to be engaged and disengaged by relative lateral movements and to be held or physically interlocked against relative longitudinal movements. To hold the members when engaged, as in service, against relative lateral movements and separation, suitable means engageable with the openings 24 and 26 is provided. In the present instance the means employed comprises a fastening pin 27 which extends through the openings and has its ends riveted, as shown at 28, the riveted ends forming enlarged integral portions of the heads lying flush with the adjacent surfaces of the link members in the countersinks 25 and holding the pin from extraction. When this pin is applied, the members 1 and 2, which are held by the arms against longitudinal displacement, are held by the pin against lateral displacement and separation. In the event, however, that it is desired to open the link for separation from a part or parts to which it is applied, this may be readily effected by cutting away one of the riveted ends, whereupon the pin may be removed and the link members separated. In a similar manner the link members may be separated whenever it is desired to substitute a new link member for a broken or unduly worn one. In either case the link members may be again fastened together by the use of a new pin.

It will be observed that the link members when engaged are coupled on a zigzag line by their arms, the engaging portions of which hold them from longitudinal movement in either direction and also from lateral pivotal movement on the pin as an axis, and, as long as the pin is in fastening position, no movement of the link members in a lateral connection can occur. Also, it will be observed that when the link members are united both eyes 4 are closed at their inner ends by the engaged arms and, as all of the arms are in lapping engagement and fastened together at the center of the link, a link of maximum strength to resist strains in all directions is produced and one presenting a large extent of surface for wear, so that great durability of the link in service is insured.

In assembling the members 1 and 2, they are brought side by side so that the tongues 10 of arms 5 and tongues 17 of arms 6 will register with the recesses 12 and 21 and so that the central portions and bosses of arms 6 will aline with the throats 7, whereupon by relative lateral movement toward each other the members may be engaged, as shown in Figs. 1, 2, 3 and 5. The tongues and recesses will then be in engagement and the apertured bosses in alinement so that upon the application of the fastening pin the members will be united against separating movement. When the pin is removed for any of the purposes before stated the links may be disconnected by moving them laterally apart. As before stated, as long as the pin is in place the link members will be held firmly united, but by merely cutting away one of the riveted ends 28 the link members may be separated in a ready, quick and convenient manner. The construction avoids the use of threaded parts, nuts or other like fastenings liable to become loose or lost or to become rusted or "frozen" and difficult to remove when it is desired to separate the link members.

In Fig. 5 a slightly modified construction of link A' is shown wherein the tongues 17 are formed with extensions 29 to fit within recess 30 in the bodies of the link members and the wall surfaces 13 and surfaces 19 of the tongues 6 are formed with recesses 31 to receive soft metal wear take up pins 32 which may be driven in when required from either side of the link. These pins may be used when looseness of the link members due to wear or other causes appears and when driven in they force the surfaces 14 and 20 in binding engagement to take up the wear and render the link firm and rigid. These pins, being made of soft metal, may be readily removed whenever it is desired to disassemble the parts of the link.

From the foregoing description, taken in connection with the drawing, the construction, mode of use and advantages of my improved detachable link will be readily understood and appreciated by those versed in the art without a further and extended description. While the structures shown are preferred, it will, of course, be understood that changes in the form, construction, arrangement and proportions of the parts, falling within the scope of the appended claims, may be made without departing from the spirit or sacrificing any of the advantages of the invention.

Having thus described my invention, I claim:

1. A detachable link or shackle comprising a pair of substantially U-shaped members each having an eye and a pair of inwardly extending arms spaced to form a throat communicating with the eye, said arms being provided with interengaging portions adapting the members to be engaged and disengaged by relative lateral movements thereof and when engaged to be held against relative longitudinal movements, the arms of the members being arranged to overlap with one arm of each member fitting within the throat of the other member when the members are in engagement, means for connecting said members and holding them from separation, and means for instituting a binding engagement between portions of the members to take up any looseness due to wear.

2. A detachable link or shackle comprising a pair of substantially U-shaped members having their arms provided with interengaging portions adapting the members to be engaged and disengaged by relative lateral movements thereof and when engaged to be held against relative longitudinal movements, means for connecting the members and holding them from separation, and means for instituting a binding engagement between portions of the members to take up any looseness due to wear.

3. A detachable link or shackle comprising a pair of members each having an eye and a pair of inwardly extending arms spaced to form a throat communicating with the eye, the arms of the members being arranged to overlap with one arm of each member fitting within the throat of the other member when the members are in engagement, said arms being provided with interengaging portions adapting the members to be engaged and disengaged by relative lateral movements thereof and when engaged to be held against relative longitudinal movements, and means for connecting said members and holding them from separation.

4. A detachable link or shackle comprising a pair of members each having an eye and a pair of inwardly extending arms spaced to form a throat communicating with the eye, the arms of the members being arranged to overlap when the members are engaged and one arm of each member being offset inwardly from the plane of the opposed arm of the other member to fit within the throat of the latter when the members are engaged, said arms being provided with interengaging portions adapting the members to be engaged and disengaged by relative lateral movements thereof and when engaged to be held against relative longitudinal movements, and means for connecting said members and holding them from separation.

5. A detachable link or shackle comprising a pair of substantially duplicate and substantially U-shaped members, each consisting of a body portion formed to provide an eye and having a pair of inwardly extending male and female arms spaced to form a throat communicating with the eye, the male arm of each member being arranged to lie in line with the adjacent end of the body of the member and being formed at its outer end with a tongue and at its inner end with a recess located on its inner side and intersecting the eye and the female arm of said member being offset inwardly of the line of the adjacent end of the body and formed at its outer end with a tongue and on its outer side with a recess, the arms of the members being relatively arranged for engagement and disengagement of the tongue and recess of the male arm of each member with the recess and tongue of the female arm of the other member by relative lateral movement of said members and to adapt the female arm of each member to close the throat in the other member when the members are engaged, said arms of the members having openings therein, and a fastening element engaging said openings to hold the members from separation.

6. A detachable link or shackle comprising a pair of substantially U-shaped members having receiving eyes and spaced arms forming throats leading to the eyes, said arms of the members being arranged to overlap when the members are brought together and provided with engaging portions adapted to be engaged and disengaged by relative lateral movements of the members and to hold the members from relatively longitudinal movements when engaged, the arrangement being such that one of the arms of each member is adapted to close the throat in the other member, and fastening means engaging the arms to hold the assembled members from separation.

7. A detachable link or shackle comprising a pair of substantially U-shaped members having receiving eyes and spaced arms forming throats leading to the eyes, said arms of the members being arranged to overlap when the members are brought together and provided with engaging portions adapted to be engaged and disengaged by relative lateral movements of the members and to hold the members from relatively longitudinal movements when engaged, the arrangement being such that one of the arms of each member is adapted to close the throat in the other member, said members being formed with opposed recesses, and soft metal pins adapted to be fitted in said recesses to take up any looseness between surfaces of the members and force said surfaces together.

GILSON C. STAATS.